(12) United States Patent
Angele

(10) Patent No.: US 7,333,970 B2
(45) Date of Patent: Feb. 19, 2008

(54) INFERENCE MACHINE

(75) Inventor: Jurgen Angele, Herxheim (DE)

(73) Assignee: Ontoprise GmbH, Karlsruhe (DE)

( * ) Notice: Subject to any disclaimer, the term of this patent is extended or adjusted under 35 U.S.C. 154(b) by 0 days.

(21) Appl. No.: 11/445,221

(22) Filed: Jun. 2, 2006

(65) Prior Publication Data

US 2007/0011125 A1 Jan. 11, 2007

Related U.S. Application Data

(63) Continuation of application No. PCT/EP2004/13769, filed on Dec. 3, 2004.

(30) Foreign Application Priority Data

Dec. 3, 2003 (DE) ............................... 103 56 399

(51) Int. Cl.
G06N 5/00 (2006.01)
(52) U.S. Cl. ............................ 706/52; 706/45; 706/50; 706/61
(58) Field of Classification Search ........... 340/825.69; 706/52, 45, 50, 61; 707/101; 715/513
See application file for complete search history.

(56) References Cited

U.S. PATENT DOCUMENTS

| 4,303,911 A * | 12/1981 | Hulick ................... 340/825.69 |
| 5,398,300 A | 3/1995 | Levey |
| 5,579,441 A * | 11/1996 | Bezek et al. ................... 706/50 |
| 5,974,405 A | 10/1999 | McGuinness et al. |
| 6,021,403 A * | 2/2000 | Horvitz et al. ................ 706/45 |
| 6,421,655 B1 * | 7/2002 | Horvitz et al. ................ 706/61 |
| 6,631,361 B1 | 10/2003 | O'Flaherty et al. |
| 6,963,875 B2 * | 11/2005 | Moore et al. ............... 707/101 |
| 6,976,210 B1 * | 12/2005 | Silva et al. ................. 715/513 |

OTHER PUBLICATIONS

Avron Barr et al., "The Handbook of Artificial Intelligence", 1982, vol. II, pp. 89-92, XP-002367515, Addison Wesley, U.S. (cited in International Search Report).

Frederick Hayes-Roth et al., "Building Expert Systems", 1983, pp. 48-49, XP-002367516, Addison Wesley, U.S. (cited in International Search Report).

(Continued)

Primary Examiner—Wilbert L Starks, Jr.
(74) Attorney, Agent, or Firm—Buchanan Ingersoll & Rooney PC

(57) ABSTRACT

The invention relates to an inference machine which is used to answer questions relating to predetermined data with the aid of an ontology, which is used to structure data, and a declarative system of rules, which reproduces additional knowledge. During the evaluation of a query, inference protocols, relating to the instantiation of the regulations which appear during evaluation, are read in an evaluation unit associated with the inference unit. Explanations relating to the evaluation of the rules are generated in the evaluation unit according to the inference protocols. A logical derivation of the answer becomes transparent. The system can answer technical questions and can carry out and explain technical considerations.

12 Claims, 3 Drawing Sheets

OTHER PUBLICATIONS

Michael C. Tanner, et al., "The Role of Explanatory Relationships in Strategies for Abduction", IEEE Expert, Jun. 1994, pp. 54-59, vol. 2, No. 3, XP-000486344 (cited in International Search Report).
Thomas Gruber, "Learning Why by Being Told What", IEEE Expert, Aug. 1991, pp. 65-75, vol. 6, No. 4, XP-000243856, IEEE Inc., New York, U.S.A. (cited in International Search Report).

Juergen Angele, et al., "Ontologies in F-Logic", Handbook on Ontologies in Information Systems, International Handbooks on Information Systems, Springer Verlag, 2003, pp. 29-43 (cited in specification).
International Search Report.
Written Opinion of the International Search Authority.

* cited by examiner

INFERENCE MACHINE

FIELD OF THE INVENTION

Inference machines are capable of answering queries by logical conclusion or finding new information.

A problem in dealing with inference machines consists in that the answers provided by an inference machine may not be understood by the person who put the query. It is thus often also difficult to improve unsatisfactory answers to a query by putting the query more precisely.

OBJECT

It is the object of the invention to render working with inference machines more user-friendly.

PRIOR ART

In the text which follows the operation of an inference machine will first be explained briefly.

As a rule, an inference machine is based on a data processing system or a computer system with means for storing data. The data processing system has a query unit for determining output variables by accessing the stored data. The data are allocated to predetermined classes which are part of at least one stored class structure forming an ontology.

In computer science, an ontology designates a data model that represents a domain of knowledge and is used to reason about the objects in that domain and the relations between them. Ontologies are logical systems that incorporate semantics. Formal semantics of knowledge-representation systems allow the interpretation of ontology definitions as a set of logical axioms. E.g. we can often leave it to the ontology itself to resolve inconsistencies in the data structure. E.g., if a change in an ontology results in incompatible restrictions on a slot, it simply means that we have a class that will not have any instances (is "unsatisfiable"). If an ontology language based on Description Logics (DL) is used to represent the ontology (e.g., OIL and DAML+OIL, cf. www.daml.org/language), we can e.g. use DL reasoners to re-classify changed concepts based on their new definitions.

The ontology preferably comprises a hierarchical structure of the classes. Within the hierarchical structure, the classes of a particular layer of the hierarchical structure are allocated to precisely one class of the higher-level layer. In general, there is only a simple inheritance of characteristics in such a case. In general, the class structure can also be arranged in different ways, for example as acyclic graph in which multiple inheritance can also be permitted.

To the classes, attributes are allocated which can be transmitted within a class structure. Attributes are features of a class. The class "person" can have the attribute "hair color", for example. To this attribute, different values (called "attribute values") are allocated for different actual persons (called "instances"), e.g. brown, blond, black, etc.

The query unit contains an inference machine or inference unit by means of which rules can be evaluated.

The rules combine elements of the class structure and/or data. Classes, attributes, synonyms, relations, that is to say relations between elements and allocations, in short everything from which the ontology or the class structure is built up are called elements of the class structure. As a rule, the rules are arranged as a declarative system of rules. An important property of a declarative system of rules consists in that the results of an evaluation do not depend on the order of the definition of the rules.

The rules enable, for example, information to be found which has not been described explicitly by the search terms. The inference unit even makes it possible to generate, by combining individual statements, new information which was not explicitly contained in the data but can only be inferred from the data.

Via the query unit, query terms which are not only formed by the stored data but can also be formed by the classes or attributes of the class structure can be input as input variables. Apart from a question "what articles did Mr. Mustermann write?"—Mustermann would be an actual name from the data—questions of the type "what are the names of all employees of company X?" are also possible. In such an example, a search term would not be used for looking for the actual name of an employee but for the values of the attribute "has name" of all instances of the employees which are related to the instance X from the class of the companies in the relation "is employed".

Such queries are frequently formulated in the F-Logic language (J. Angele, G. Lausen: "Ontologies in F-Logic" in S. Staab, R. Studer (eds.): Handbook on ontologies in Information Systems. International Handbooks on Information Systems, Springer Verlag, 2003, page 29). To provide a rough, intuitive understanding of F-Logic, the following example can be used which maps the relations between known biblical persons:

First some facts:
abraham:man.
sarah:woman.
isaac:man [fatherIs->abraham; motherIs->sarah].
ishmael:man[fatherIs->abraham; motherIs->hagar:woman].
jacob:man[fatherIs->isaac; motherIs->rebekah:woman].
esau:man[fatherIs->isaac; motherIs->rebekah].

Certain classes can be recognized: "man" and "woman". Abraham is thus a man. The class "man" has e.g. the attributes "father" and "mother"; the attributes thus specify the parents. E.g. the man Isaac has the father Abraham and the mother Sarah.

F-Logic is recognizably also suitable as a language for formulating a class structure. Apart from F-Logic, however, the ontology languages RDF, DAML+OIL and OWL are preferably used for defining class structures.

Continuing with some rules which reproduce relations:
FORALL X,Y X[sonIs->>Y]<- Y:man[fatherIs->X].
FORALL X,Y X[sonIs->>Y]<- Y:man[motherIs->X].
FORALL X,Y x[daughterIs->>Y]<- Y:woman[fatherIs->X].
FORALL X,Y X[daughterIs->>Y]<-Y:woman[motherIs->X].

In F-Logic rules always have a rule header on the left and a rule body on the right. Translated, the first rule is, e.g.: if Y is a man whose father was X, Y is one of the sons of X. The single arrow "->" indicates that only one value is possible for a particular attribute, whereas the double arrow "->>" indicates that a number of values are possible.

Finally, a query which asks for all women who have a son whose father is Abraham. In other words: with which women did Abraham have a son?
FORALL X,Y <- X:woman[sonIs->>Y[fatherIs->abraham]].

A query has the form of a rule but without the rule header on the left. The answer is:
X=sarah
X=hagar.

Such systems are known, e.g. from DE 101 03 845 A1.

Solution

The data processing system according to the invention has at least one information generating unit and/or storage unit for storing and/or generating data forming a database. In this arrangement, information can be obtained, e.g. via sensors, the Internet, via sensors connected to the Internet or other input possibilities. Data to be considered are e.g. operating states of machines, also temperature values of different cities in the world and other data such as are mentioned, e.g. in the examples following.

Furthermore, the data processing system has at least one computer unit for generating an ontology which comprises a class structure with classes and, as a rule, attributes allocated to these. The data can be structured by means of the ontology.

Apart from the class structure, the ontology comprises a declarative system of rules.

The data processing system has an input/output unit for inputting a query and for outputting answers to the query. It also has an inference unit in which the rules are evaluated for generating an answer to a query.

Allocated to the inference unit is an evaluation unit, into which inference protocols relating to instantiations of rules can be read. In the evaluation unit, explanations about the evaluation of rules are generated in dependence on the inference protocols.

By means of an output of explanations, a user, following a query performed by him, receives documentation as to how this query was processed in order to generate from it a particular output variable. The logical steps, the derivation for answering the query is displayed. The explanations thus provide the user with a possibility of controlling the production of the answer to a query. In particular, the user can use the explanations for checking the relevance and trustworthiness, i.e. generally the quality of an output variable generated in the data processing system. A further advantage for the user is that he can formulate subsequent queries more precisely by means of the explanations specified. This creates a data processing system with considerably improved search capabilities.

Such a system can be used for answering technical queries. For example, a technical expert system can be built up which is capable of performing technically correct deliberations, drawing technically correct conclusions and also explaining these. Technical proposals based on technical considerations can be submitted.

The explanations are generated in an evaluation unit which preferably has an inference unit. In this inference unit, the explanations are generated by evaluating predetermined explanation rules. The input variables used for this are inference protocols which contain the facts (instances) which were used for processing a query in the instantiation of rules in the inference unit of the query unit.

The explanations are thus generated analogously to the evaluation of the queries by evaluating rules which are application-specifically predetermined and can be changed if necessary.

According to a first variant, one explanation can be generated for each inference step defined by a rule, which is performed for processing a query in the inference unit of the query unit, and output as output variable. In this variant, the greatest possible degree of detailing is obtained in the generation of the explanations since each inference step is individually documented.

According to a second variant, a number of inference steps for processing queries can be dealt with in a single explanation. This provides a higher degree of abstraction of the explanation.

In any case, the explanations are generated by means of explanation rules which are processed in the inference unit of the evaluation unit. In a particularly advantageous embodiment, further explanation rules are provided in order to select between different explanation possibilities. In particular, the output of redundant explanations can be avoided by means of such explanation rules.

In a particularly advantageous embodiment, external data are also included for generating the explanations which considerably increases the information content of the explanations. In a particularly advantageous manner, these data can be structured in at least one ontology.

An example of such external data are user profiles of users who use the data processing system for search purposes. By evaluating the user profiles, explanations are generated which are optimally matched to the respective user, in particular his knowledge, training and the like.

The object of the invention is also achieved via a method. In the text which follows individual method steps will be explained in greater detail. The steps do not necessarily need to be performed in the order specified and the method to be described can also have other steps not mentioned.

According to the method, the following steps are performed, particularly by using a data processing system. Firstly, a database is generated and/or stored. Furthermore, an ontology is generated which comprises a class structure and a declarative system of rules. The data can be structured by means of the ontology. The rules combine elements of the class structure and/or data. A query is input. An inference unit evaluates the query by evaluating the rules. During the evaluation of the query, inference protocols relating to instantiations of the rules which have occurred during the evaluation are generated in an evaluation unit allocated to the inference unit. In the evaluation unit, explanations relating to the evaluation of the rules are generated in dependence on the inference protocols.

Furthermore, the scope of the invention includes a computer program which, when running on a computer or on a multiplicity of computers of a computer network, executes the method according to the invention in one of its embodiments.

The scope of the invention furthermore includes a computer program with program code means for performing the method according to the invention in one of its embodiments when the program is executed on a computer or on a multiplicity of computers of a computer network. In particular, the program code means can be stored on a computer-readable data medium.

In addition, the scope of the invention includes a data medium on which a data structure is stored which, after being loaded into an internal and/or main memory of a computer or of a multiplicity of computers of a computer network, can execute the method according to the invention in one of its embodiments.

The scope of the invention also includes a computer program product with program code means stored on a machine-readable medium in order to perform the method according to the invention in one of its embodiments when the program is executed on a computer or on a multiplicity of computers of a computer network.

In this context, a computer program product is understood to be the program as commercial product. In principle, it can be available in any form, for example on paper or a computer-readable data medium and, in particular, can be distributed via a data transmission network.

Finally, the scope of the invention includes a modulated data signal which contains instructions which can be executed by a computer system or by a multiplicity of computers of a computer network, for executing the method according to the invention in one of its embodiments. The computer system to be considered can be both a stand-alone computer and a network of computers, for example an in-house intranet or also computers which are connected to one another via the Internet. Furthermore, the computer system can be implemented by a client-server constellation wherein parts of the invention run on the server and others on a client.

Other details and features of the invention are obtained from the subsequent description of preferred exemplary embodiments in conjunction with the subclaims. In this context, the respective features can be realized by themselves or as several in combination with one another. The invention is not restricted to the exemplary embodiments.

The exemplary embodiments are shown diagrammatically in the figures. Identical reference numbers in the individual figures designate identical or functionally identical elements or those which correspond to one another with regard to their functions. In detail:

Figure 1:
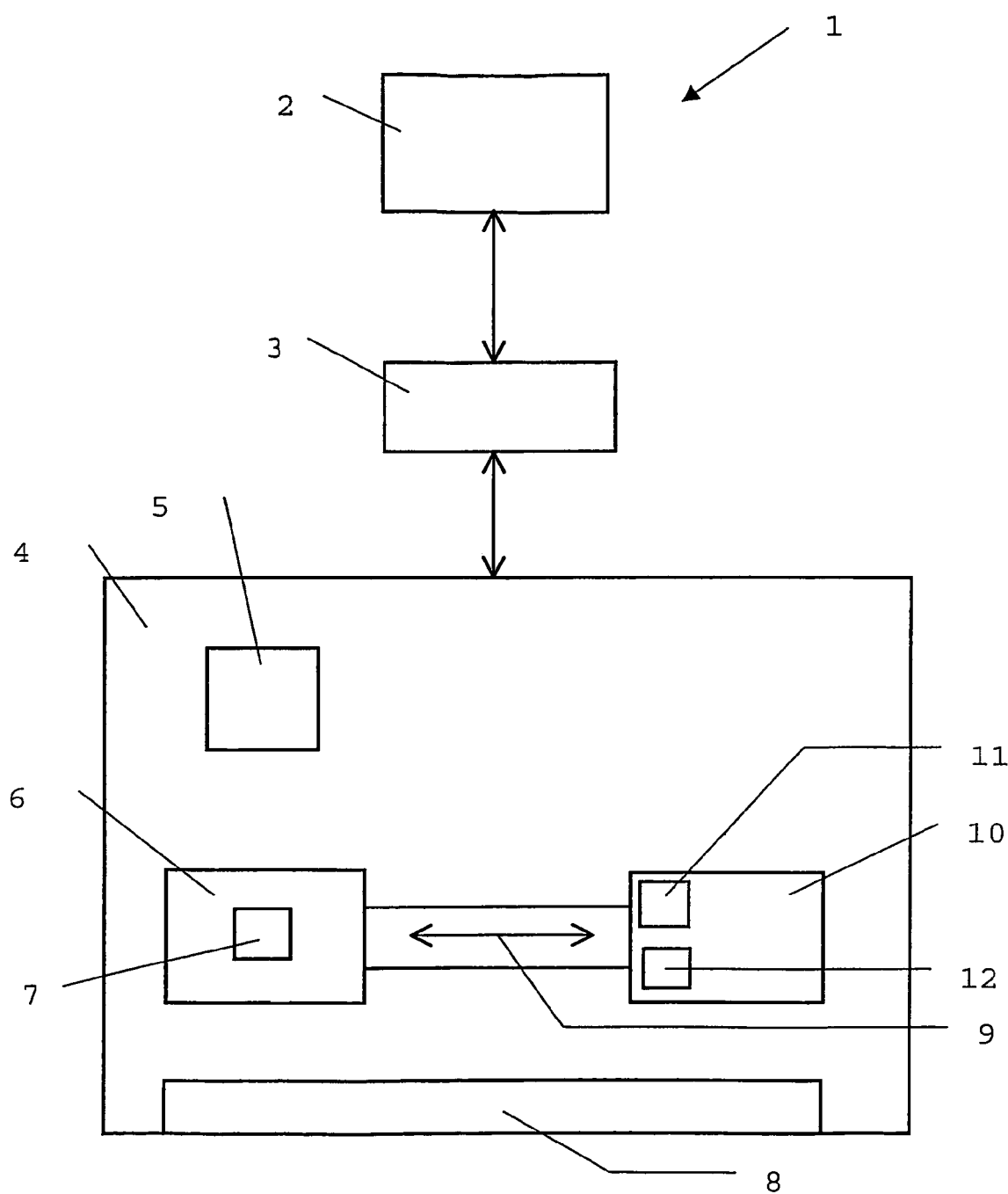
FIG. 1 shows a diagrammatic representation of an exemplary embodiment of the data processing system according to the invention.

FIG. 1 shows an exemplary embodiment of the data processing system 1 according to the invention. The data processing system 1 has a storage unit 2 on which a set of data is stored. The storage unit 2 is formed by a database system, a file system (i.e. by a quantity of files stored on a computer) or the like.

In principle, a number of database systems integrated on different computer systems can also be provided if necessary.

To the storage unit 2, a server 3 is allocated via which the data stored in the storage unit 2 are accessed. A computer unit 4 is allocated to this server 3. The computer unit 4 consists of a processor system or the like. In the simplest case, the computer unit 4 is formed by a personal computer or a workstation.

The computer unit 4 has a first software module 5 by means of which an ontology can be generated. The ontology can be used for structuring the data of the storage system in a class structure.

The software module 5 is connected to a query unit 6 which also consists of a software module. In the query unit 6, a first inference unit 7 is implemented.

The computer unit 4 according to FIG. 1 also comprises an input/output unit 8 via which information can be input into the computer unit 4 or output out of the computer unit 4. The input/output unit 8 essentially consists of a terminal.

The query unit 6 is connected via an interface module 9 to an evaluation unit 10 in which a second inference unit 11 is implemented. Furthermore, the evaluation unit 10 has a software module 12, by means of which a further ontology can be generated. This ontology can be used for structuring external data. The external data are accessed via the server 3 or suitable interface components.

The operation of the data processing system 1 according to FIG. 1 will be explained with reference to FIG. 2 in the text which follows.

The set of data stored in the storage unit 2 is structured by means of the ontology generated by means of the software module 5. Such an ontology generally has a structure of classes, wherein the structure can be formed as a hierarchical structure. In hierarchical structures, classes of a predetermined layer are in each case precisely allocated to a class of a layer above it. Only simple inheritances are permitted. In general the class structure can also be arranged as acyclic graph in which multiple inheritances are permitted.

Figure 2:
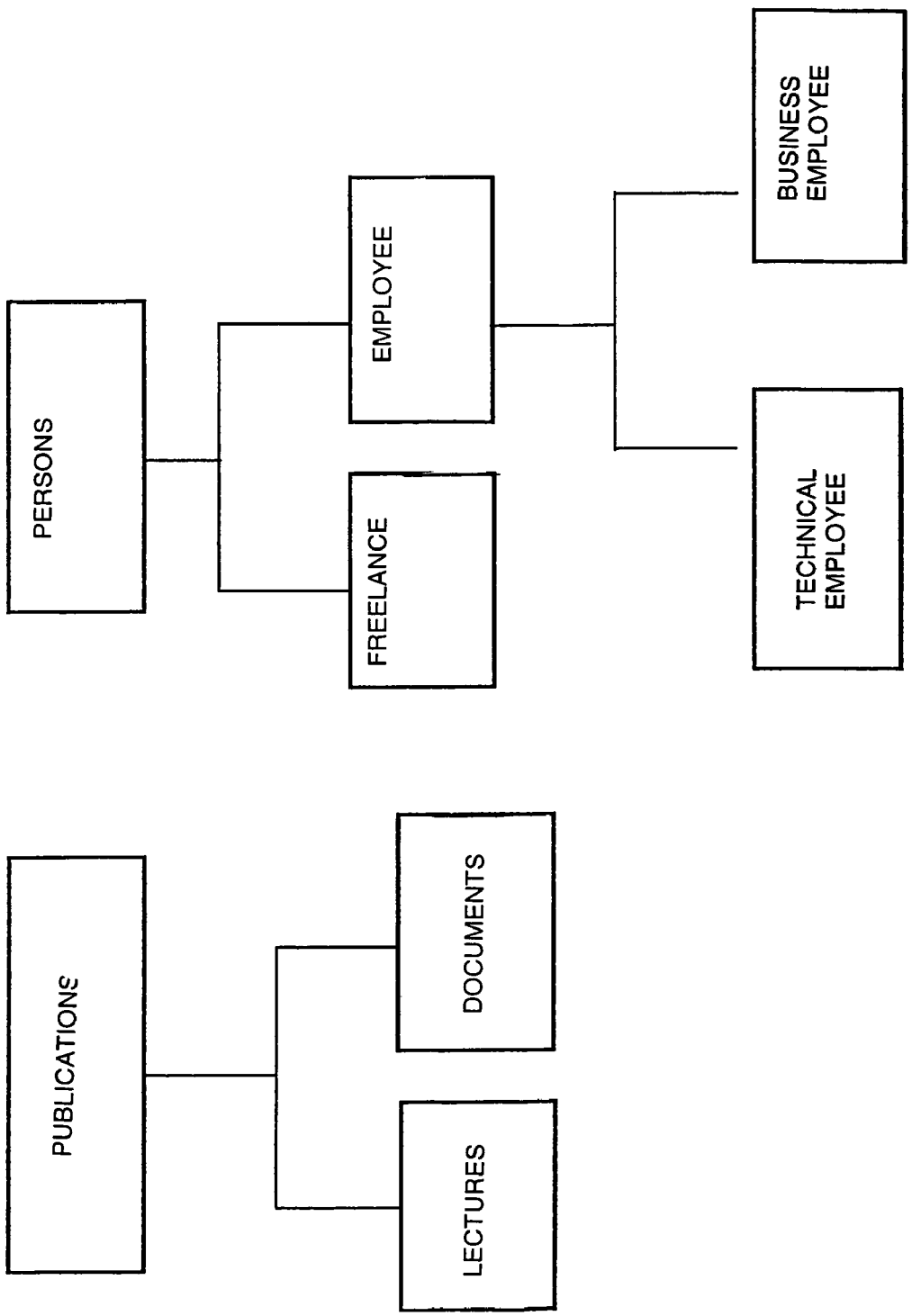
FIG. 2 shows an example of a class structure for the data processing system according to FIG. 1.

FIG. 2 shows by way of example two such hierarchical class structures which in each case form an ontology. The first ontology contains a class "publications" to which "lectures" and "documents" are allocated as sub-class. The second ontology contains a class "persons" to which "freelance" and "employee" are allocated as subclasses. "Technical employee" and "business employee" are allocated to the subclass "employee" as further subclasses.

Certain attributes are allocated to the classes of, in each case, one hierarchical class structure. An attribute which is allocated to a class such as, for example, to the class "persons" is passed on to the subclasses which are subordinate to the class. Such an attribute can be, for example, a company site. This attribute is passed on within the class structure, in the present example to the subordinate classes "freelance" and "employee" and also the subclasses "business employee" and "technical employee" allocated to this class.

This results in a particularly efficient structuring of the data. To perform searches in the database, a user inputs queries as input variables via the input/output unit 8 of the computer unit 4. The queries are processed in the query unit 6, particularly in the inference unit 7 implemented there. In this process, rules suitable for processing a query are sought and evaluated there.

The rules in the inference unit 7 contain logical combinations between classes and/or attributes and/or data of the database. Since the rules are a declarative system, the order of the definition of the rules does not play a role. In the inference unit 7, the rules allocated to a query are evaluated for generating defined output variables. The output variables are then suitably output via the input/output unit 8.

The rules are preferably produced in the rule languages F-Logic, OWL, TRIPLE, SWRL or RULEML, the class structure of the ontology preferably being arranged as F-Logic, RDF(S) or OWL model.

Combining attributes and classes via a predetermined number of rules makes it possible to query subsets of data in the database in a simple manner without having to refer to certain data in the query commands.

EXAMPLE 1

In the text which follows, an example of a query of this type will be described. A user would like to ask about the expertise of a person known to the user by the name "Mustermann". For a particular ontology, a corresponding query could be expressed in F-Logic as follows:

FORALL X,Y <- X:Person[Name->Mustermann; Knowledge->>Y].

A rule which can be used for answering this query can be formulated as follows: "When a person writes a document and this document deals with a given subject, this person has knowledge about this subject". In F-Logic, this rule could be expressed as follows (see below):

```
FORALL
    X,Y,Z Y[Knowledge->>Z] <- X:Document[Author->>Y:Person]
                AND X[Subject->>Z].
```

In this manner, the classes "person" and "document" are linked to one another. Reference is made to the subject of the document which is an attribute of the class "document". The expertise of the person having the name "Mustermann" is obtained as output variables for the query formulated above.

To implement this example, various logic languages can be used. As an example, an implementation with the preferred logic language "F-Logic" is described.

```
/* Ontology */

Author:: Person. Subject:: science.
biotechnology: Subject.
physics: Subject.
chemistry: Subject.
Document[Author=>>Author; Subject=>>Subject].
Person[AuthorOf=>>Document].
```

In this first section, the ontology itself is defined. The data contain documents with two relevant attributes: the author and the field of knowledge.

```
/* Facts */

Paul: Person.
Anna: Person.
Mustermann: Person.
doc1: Document[Subject->>biotechnology; Author->>Paul].
doc2: Document[Subject->>biotechnology; Author->>Paul].
doc3: Document[Subject->>chemistry; Author->>Paul].
doc100: Document[Subject->>physics; Author->>Anna].
doc101: Document[Subject->>physics; Author->>Anna].
doc200: Document[Subject->>biotechnology; Author->>Mustermann].
```

In this section, we have defined the facts of the ontology. There are six documents (designated by doc1, . . . , doc200) with the subjects mentioned and the authors mentioned. An alternative formulation of the above query follows:

```
/* Query */

FORALL X <- Mustermann[Knowledge->>X:Subject].
```

This section is the actual query section. Using the rule defined in the preceding section, we derive the expertise of the author "Mustermann" by logical conclusion.

In the inference unit 7 the above query is evaluated with the aid of the above rule. This is explained by means of the so-called "forward chaining" method. In this method, the rules are applied to the facts and the facts obtained thereby for as long as new data can be derived.

Using the above facts relating to the documents and using the above rule:

```
FORALL  X,Y,Z  Y[Knowledge->>Z]  <- X:Document[Author-
>>Y:Person] and X[Subject->>Z].
``` all replacements of the variables X, Y and Z are first sought for which the body of rules (the right-hand side) is logically true:
X=doc1, Y=Paul, Z=biotechnology
X=doc2, Y=Paul, Z=biotechnology
X=doc3, Y=Paul, Z=chemistry
X=doc100, Y=Anna, Z=physics
X=doc101, Y=Anna, Z=physics
X=doc200, Y=Mustermann, Z=biotechnology Once the variables in the rule header have been replaced by these values, the following derived facts are obtained as a result:

```
Paul[Knowledge->>biotechnology].
Paul[Knowledge->>chemistry].
Anna[Knowledge->>physics].
Mustermann[Knowledge->>biotechnology].
```

In the next step of answering our query
FORALL X <- Mustermann[Knowledge->>X:Subject].
the values for which the query is logically true are sought for X:
x=biotechnology This substitution of variables supplies the result of our query. The result is preferably output via the input/output unit 8.

The query was processed by an instantiation of the rule, i.e. so-called instances (facts), the input variables "knowledge" and "Mustermann" are allocated to the rule as actual values.

In the evaluation unit 10, a explanation is generated for this which is output as further output variable via the input/output unit 8. To generate the explanation relating to the production of the query result to the query of the user, an inference protocol is read into the inference unit 11 of the evaluation unit 10 via the interface module 9. The inference protocol generally contains an indexation which specifies what rules were processed during a query. Furthermore, the inference protocol contains the instances (facts) of the respective rules for processing the query.

In the present example, the inference protocol, in addition to the information that the one rule has been processed, contains as instances:
Person=Mustermann
Document=doc200
Subject=biotechnology In the inference unit 11 of the evaluation unit 10, the explanation for the rule is generated by a explanation rule which, in the present case, is:
Person "has written the document" Document.
"The document deals with" Subject.
"For this reason," Person "has knowledge about" Subject.

In this arrangement, Person, Document and Subject form variables to which the instances of the inference protocol were assigned for processing the explanation rules.

In this context, Person forms the variable person value to which the instance "Mustermann" is assigned in the present case. Document forms the variable document value to which the instances "doc200" are assigned. Finally, Subject forms the variable subject value to which the instance "biotechnology" is assigned.

In this manner, the following explanation is generated by means of the inference protocol and the explanation rules and output as output variable via the input/output unit 8:

"Mustermann has written the document doc200. The document deals with biotechnology. For this reason, Mustermann has knowledge about biotechnology."

In the inference unit 7 of the query unit 6, a plurality of rules are implemented and, in general, several rules are processed for answering a query.

In principle, explanations can be generated in such a manner that for each rule processed in the inference unit 7 a explanation is generated in the inference unit 11. This case represents the greatest possible detailing in the generation of explanations.

As an alternative, a single explanation can also be generated for a plurality of rules which are needed for processing a query, which then exhibits a higher degree of abstraction.

EXAMPLE 2

The description of a chemical process is a further example of the generation of explanations.

In the case where a separate explanation for describing the chemical process is generated for each rule, i.e. each inference step which is performed in the inference unit 7, the following three-stage explanation scheme can be generated for a three-stage chemical process which, in the example following, is a precipitation reaction:

a) Dissolving the substances AB and CD in solution into their ionic components A+, B−, C−, D+.

b) Forming an insoluble substance AC from these components.

c) Precipitating the substance AC out of the solution as precipitation reaction.

In F-Logic, this can be expressed as follows, for example:

```
// the Substances
m1:IonicMolecule[cation->A; anion->B].
m2:IonicMolecule[cation->D; anion->C].
m3:IonicMolecule[cation->A; anion->C].
m3:InsolubleMolecule.
// the Mixture
mx:Mixture[component->>{m1,m2}].
// Recombination of the ions
// if substance M1 and substance M2 are in the solution and
if M3 (combined from the ions of M1 and M2) is an ionic substance,
M3 is also contained in the solution.
FORALL M,M1,M2,M3,M1C,M1A,M2C,M2A
Rule recombination: M[component->>{M3}] <-
M:Mixture[component->>{M1,M2}] and M1:IonicMolecule[cation-
>M1C; anion->M1A] and M2:IonicMolecule[cation->M2C; anion-
>M2A] and M3:IonicMolecule[cation->M1C; anion->M2A].
// Definition of the precipitation substances
FORALL M,C,B,D
Rule dropout: M[dropoutfaelltaus->>C] <-
M:Mixture[component->>{C,B,D}] and C:InsolubleMolecule and
C!=B and B!=D.
```

The explanations are generated in parallel to this.

By using additional explanation rules, the aforementioned multistage description consisting of the three explanations can be combined into one abstract explanation, namely:

"In a solution with the substances AB and CD, the substance AC is precipitated."

In F-Logic, this abstract explanation can be expressed, for example as follows:

FORALL Out,BV,DV,CV
Explanation(Out) <- I:Instantiation[rule->dropout; value@(B) -> BV; value@(D) ->DV; value@(C) ->CV] and Out is "In a solution with the substances [BV] and [DV], the substance [CV] is precipitated".

In a further embodiment, explanation rules can be used for avoiding redundant explanations.

For example, in the field of chemistry, the degree of acidity of two substances can be determined by determining the pH values which are calculated by the sets of respective substances dissolved in aqueous solutions. As an alternative, a qualitative determination can be made, for example by determining the number of oxygen atoms in the formulae of these substances. Both calculation methods can be output as output variables for describing the substances by the inference unit 11 in the form of explanations. Using additional explanation rules, only one of the two explanations can be selected by means of a relevancy check so that the output variables no longer exhibit any redundant explanations.

Since the evaluation unit 10 has an interface to external data, these external data can also be included in the generation of explanations as defined external knowledge. In the exemplary embodiment according to FIG. 1, the evaluation unit 10 has, in addition to the inference unit 11, the software module 12 by means of which at least one ontology is generated for structuring external data. The mode of operation of the inference unit 11 and of the software module 12 is analogous to the inference unit 7 and the associated software module 5.

In the case of the description of chemical processes, an example of such external data are names for describing chemical substances. If in the performance of queries relating to chemical processes, chemical substances are identified by chemical formulas in the database of the storage unit 2, explanations generated without access to the external data could only contain these chemical formulas for describing and documenting chemical processes. By additionally accessing the external data, instead of the chemical formulas, their names can also be used in the formulation of the explanations for describing substances. A simple example of such a name is water, for describing the substance $H_2O$.

A further example of external data are user profiles used by the data processing system 1. The user profiles are preferably stored as data files in the computer unit 4 and are structured with an ontology generated in the software module 12.

In dependence on these data, a selection of explanations generated with other explanation rules can be made by means of explanation rules in the inference unit 11. The result is that the selected explanations output via the input/output unit 8 are matched to the respective user profiles.

For example, the explanations generated in the inference unit 11 can thus be adapted to the state of knowledge of the respective user. In the case where chemical processes are explained with the explanations, the explanations can be made at a qualitative level if the user is a student. If, in contrast, the user is a graduate chemist, for example, the explanations can also contain quantitative calculations.

Figure 3:
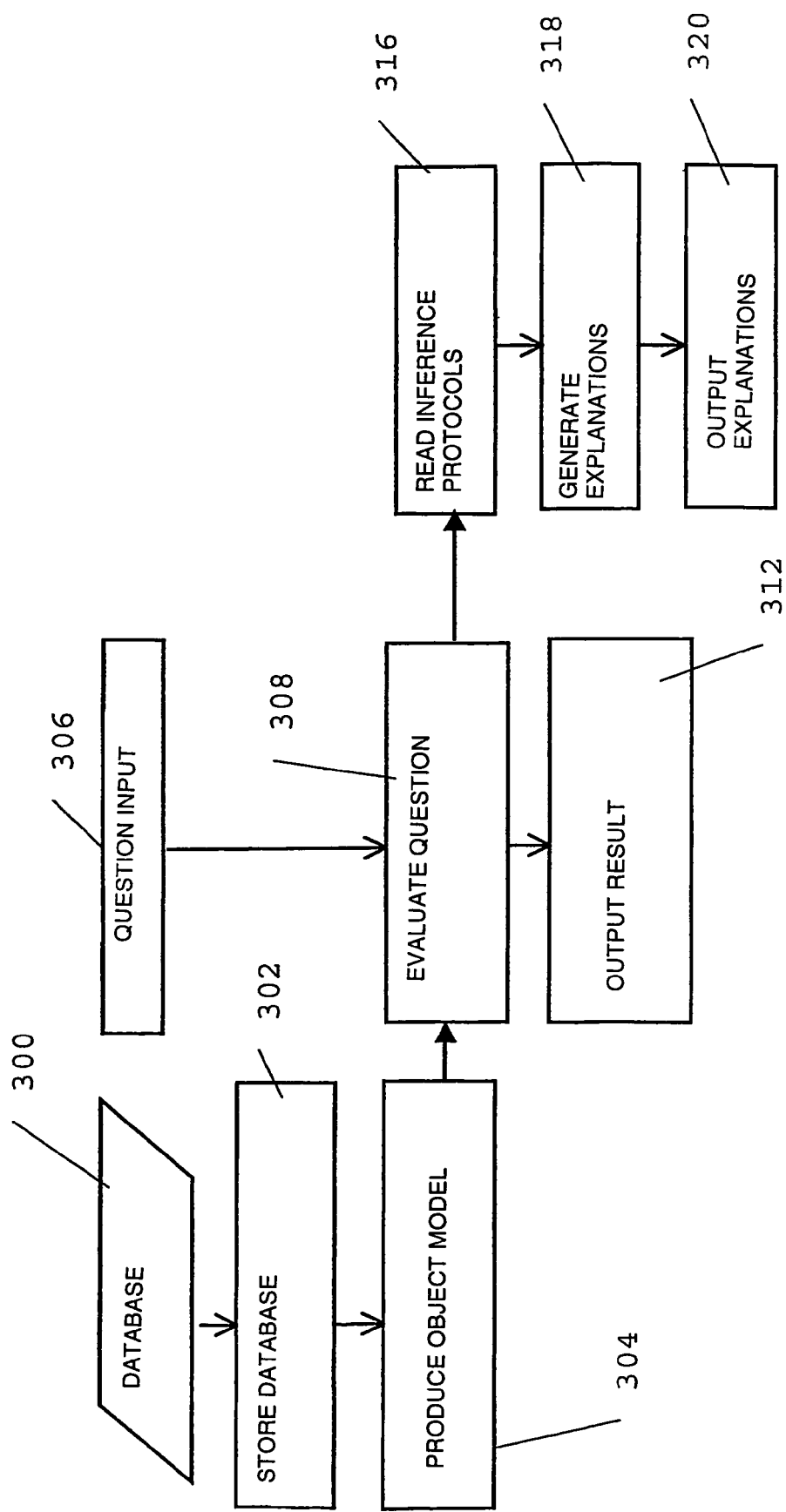
FIG. 3 shows a diagrammatic representation of the method sequence.

FIG. 3 shows a diagrammatic representation of the method sequence in the data processing system. Firstly, a database is generated in step 300 and/or the database is stored 302. Furthermore, an ontology which comprises a declarative system of rules and a class structure is created in step 304. The data are structured with the aid of the ontology. The rules combine elements of the class structure and/or data with one another. A query 306 is input via an input device. The evaluation 308 of the query is done in an inference unit by evaluating the rules. The outputting 312 of the results of the evaluation 308 occurs via an output unit. During the evaluation 308, inference protocols about instantiations of the rules which have occurred during the evaluation are read in 316 in an evaluation unit which is allocated to the inference unit. Depending on the inference protocols, explanations about the evaluation of the rules are generated in the evaluation unit in step 318. The explanations generated are output via an output unit in step 320.

REFERENCE SYMBOLS

1 Data processing system
2 Storage unit
3 Server
4 Computer unit
5 Software module
6 Query unit
7 First inference unit
8 Input/output unit
9 Interface module
10 Evaluation unit
11 Second inference unit
12 Software module
300 Database
302 Storing the database
304 Generating an ontology
306 Query input
308 Evaluating the query
312 Outputting the results
316 Reading in inference protocols
318 Generating explanations
320 Outputting explanations

LIST OF REFERENCE QUOTED

J. Angele, G. Lausen: "Ontologies in F-Logic" in S. Staab, R. Studer (eds.): Handbook on Ontologies in Information Systems. International Handbooks on Information Systems, Springer Verlag, 2003, page 29.

The invention claimed is:

1. A data processing system, comprising:
 a) a database;
 b) a computer unit for generating an ontology comprising a class structure that defines the structure of data stored in said database, and a declarative system of rules, wherein the rules combine elements of the class structure and/or data;
 c) an input/output unit for inputting a query to retrieve data from said database and for outputting data responsive to the query; and
 d) a first inference unit in which the rules are evaluated for generating an answer to the query;
 wherein:
 e) the first inference unit is associated with an evaluation unit, which comprises a second inference unit;
 f) within the second inference unit an explanation of the answer to the query is generated by evaluating predefined explanation rules;
 g) inference protocols are read into the evaluation unit, which state, which rules were evaluated for answering the query, and which contain the facts, which were used for instantiation of the rules for answering the query; and
 h) the inference protocols form instances of the explanation rules.

2. The data processing system as claimed in claim 1, wherein the explanation rules are expressed in F-Logic.

3. The data processing system as claimed in claim 1, wherein one explanation is allocated to a plurality of rules.

4. The data processing system as claimed in claim 3, wherein for generating an explanation for a predetermined number of rules, an explanation rule or a group of explanation rules is provided by means of which the rules are described summarily.

5. The data processing system as claimed in claim 1, wherein a selection of various explanation possibilities is performed by means of explanation rules.

6. The data processing system as claimed in claim 1, wherein the explanations are dependent on external data.

7. The data processing system as claimed in claim 6, wherein the external data are structured by means of an ontology.

8. The data processing system as claimed in claim 6, wherein the external data are formed by user profiles of the users performing the queries.

9. The data processing system as claimed in claim 6, wherein the external data form instances for the explanation rules.

10. A method for retrieving information from a database, comprising the following steps:
 generating an ontology which comprises a class structure that defines the structure of data in the database, and a declarative system of rules,
 wherein the rules combine elements of the class structure and/or data;
 inputting a query;
 evaluating the query in a first inference unit by evaluating the rules and generating an answer containing data from said database;
 within a second inference unit, in an evaluation unit allocated to the first inference unit, generating an explanation of the answer to the query by evaluating predefined explanation rules; and
 reading inference protocols into the evaluation unit, which state which rules were evaluated for answering the query, and which contain the facts which were used for instantiation of the rules for answering the query;
 wherein the inference protocols form instances of the explanation rules.

11. A computer-readable medium containing computer program which, when run on a computer, executes the method claimed in claim 10.

12. A data medium on which a data structure is stored which, after being loaded into a memory of a computer, executes the method claimed in claim 10.

* * * * *